Figure 1:
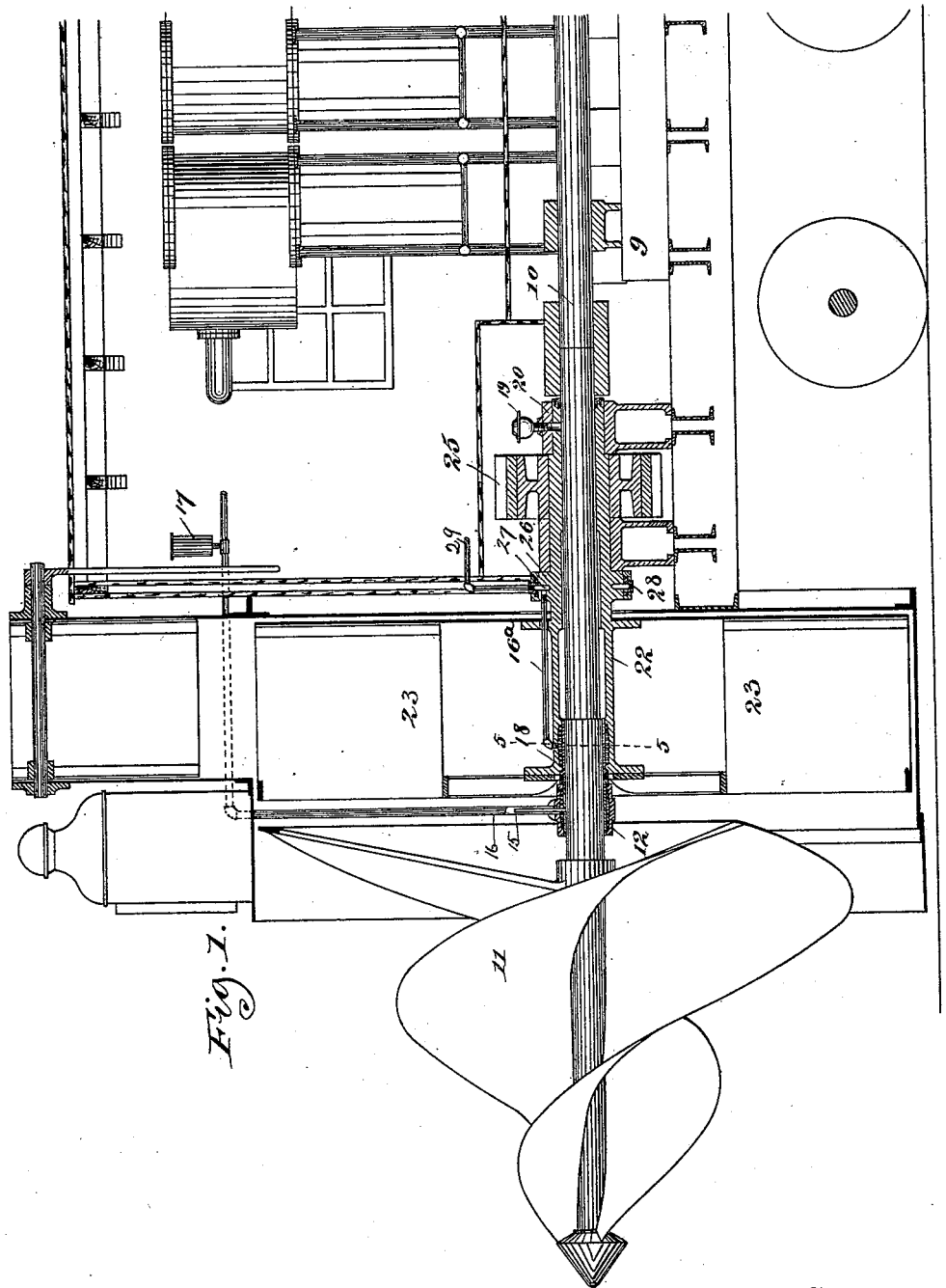

(No Model.)   2 Sheets—Sheet 1.

G. WARRINGTON.
LUBRICATOR.

No. 423,580.   Patented Mar. 18, 1890.

Witnesses
C. C. Linthicum
N. M. Bond

Inventor
George Warrington
By his Attorneys Offield & Towle (No Model.) 2 Sheets—Sheet 2.
G. WARRINGTON.
LUBRICATOR.
No. 423,580. Patented Mar. 18, 1890.
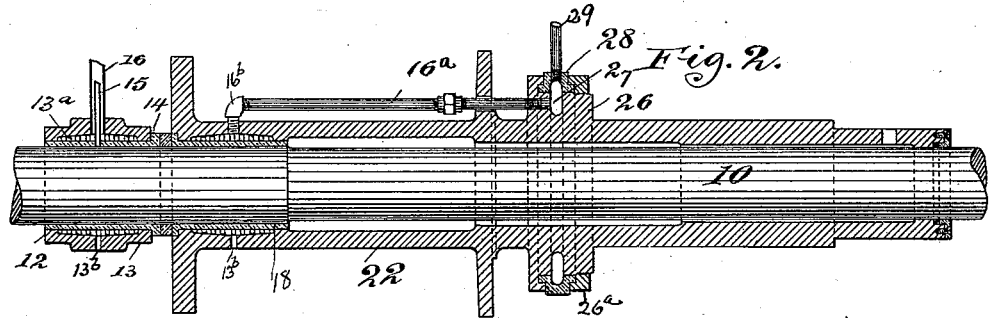
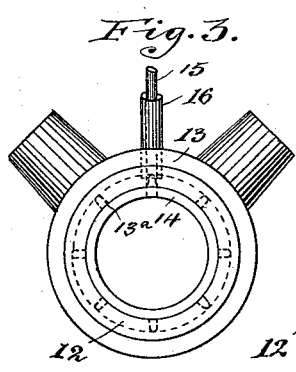
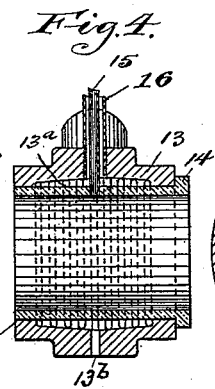
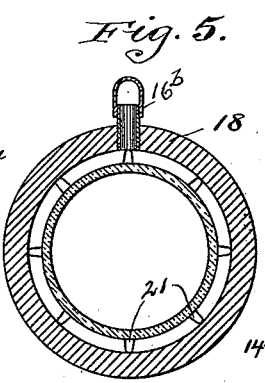
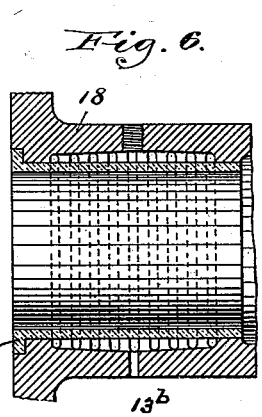
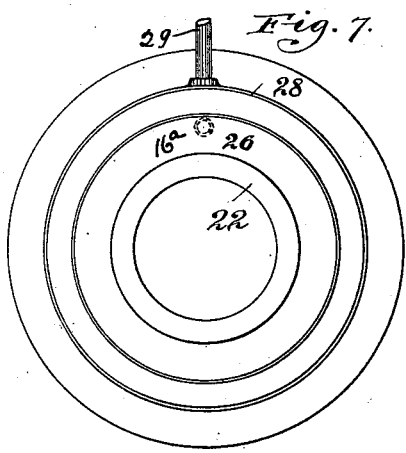
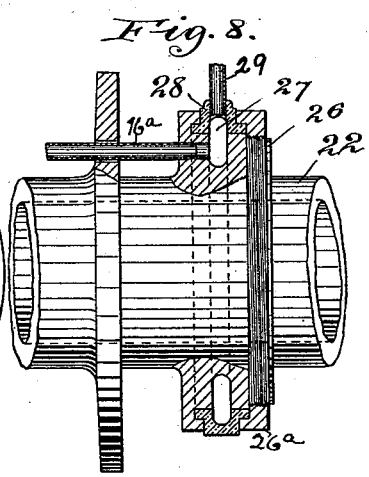
Witnesses
C. C. Linthicum
A. M. Bond
Inventor
George Warrington
By his Attorneys Offield & Towle

UNITED STATES PATENT OFFICE.

GEORGE WARRINGTON, OF CHICAGO, ILLINOIS.

LUBRICATOR.

SPECIFICATION forming part of Letters Patent No. 423,580, dated March 18, 1890.

Application filed December 4, 1889. Serial No. 332,527. (No model.)

*To all whom it may concern:*

Be it known that I, GEORGE WARRINGTON, a citizen of the United States, residing at Chicago, in the county of Cook and State of Illinois, have invented certain new and useful Improvements in Lubricators, of which the following is a specification.

It is the object of my invention to provide means for the thorough lubrication of bearings, and particularly such bearings as are exposed to the influence of low temperatures. An instance of this kind is met with in the construction and operation of snow-plows, in which an excavator is projected from the front of a car, the excavator consisting of an auger carried upon the end of a rotating shaft mounted in bearings longitudinally of the car. These bearings, and particularly the one nearest the auger, are so exposed that ordinary means of lubrication have failed to give satisfaction, the lubricant being congealed before it reaches the shaft-bearing. A further difficulty met with in the lubrication of the auger-shaft bearing in snow-plows is that of conveying the lubricant to the shaft-bearing and at the same time provide for operating a fan for the delivery of the snow on either side of the track. I provide an annular chamber from which the live steam for heating the bearing is supplied, while the fan may be run in either direction.

To overcome the difficulties above pointed out, I provide a pipe through the hollow of which the lubricant is conducted to the bearing, and this pipe is contained within a second pipe of larger diameter concentrically placed with reference to the first, and furnishing therewith an annular chamber into which live steam is introduced, and thereby the oil-pipe is kept warm and the fluidity of the lubricant maintained even at a temperature below freezing. I also provide steam-ways, whereby the entire bearing is kept warmed.

In the accompanying drawings I have illustrated a snow-plow to the main shaft of which my means of lubrication are applied.

In said drawings, Figure 1 is an elevation, partly in section, of the front end of a snow-plow car with a rotatable auger-shaft, the bearings whereof and a sleeve for rotating the fan are shown in section. Fig. 2 is a side elevation of a portion of said shaft, the bearings whereof are in vertical section. Fig. 3 is a transverse sectional view of the bearing at the forward end of the shaft, showing the ducts or channels in the face thereof for the distribution of the steam. Fig. 4 is a longitudinal sectional elevation of the same bearing, showing the oil and steam pipes in vertical section on line 5 5, Fig. 1. Fig. 5 is a transverse section through the second bearing from the auger with the elbow of a steam-pipe in section. Fig. 6 is a longitudinal section of the same. Fig. 7 is a transverse vertical section of the shaft-bearing and the sleeve, whereby the fan is adapted to be rotated in either direction; and Fig. 8 is an elevation of the same parts, partly in section.

In the drawings, 9 represents a portion of the car which is adapted to support a snow-plow-auger shaft 10, having the blades 11.

The bearing next the auger-blades (marked 12) is shown in detail in Figs. 3 and 4, and comprises a sleeve 13, the interior of which is channeled to provide steamways $13^a$, whereby a circulation of steam entirely around the bearing is maintained. Inside of this sleeve is a bushing 14, the exterior wall of which is perforated to receive the end of the oil-pipe 15. The exterior sleeve has a screw-threaded aperture to receive the threaded end of a steam-pipe 16, which incloses the oil-pipe, both of said pipes being carried upwardly, the steam-pipe having suitable connection with the steam-supply and the oil-pipe being supplied from a cup, as 17, located, preferably, at some distance from the bearing, so as to be out of the influence of the low temperature to which the latter is subjected.

18 represents a second bearing, (shown in Figs. 5 and 6,) and in all respects similar to the one just described, except that the oil-pipe is omitted, oil being supplied to the shaft from a stationary cup 19, mounted on a stationary cap 20, and admitting oil to the interior of the sleeve through perforations 21 therein. The steam is supplied to this bearing through a pipe $16^a$, which communicates with the steamways $13^a$ through an elbow-pipe $16^b$.

The bearings 12 and 18 are provided with the escape-openings $13^b$.

22 is a driving-sleeve for the fan 23, which sleeve has a gear 25, whereby it may be rotated in either direction. The steam-pipe 16ª is carried by the sleeve.

26 is a flange on the sleeve 22 and having the annular steam-space 27, with which the steam-pipe 16ª communicates.

28 is a circular cap which forms a cover for the chamber 27, and this cap is stationary, while the sleeve itself may be rotated in either direction. The flange 26 has annular shoulders 26ª, which are adapted to embrace the edges of the circular cap 28.

29 is a stationary steam-pipe, which is tapped through the circular cap 28 and supplies steam to the annular chamber 27, from whence the steam escapes through the pipe 16ª to the bearing 18. It will be observed that this permits the rotation of the steam-pipe over the second bearing, while the shaft is kept warmed by the steam in the annular chamber 27, and the oil is supplied to the shaft throughout the length of the sleeve from the cup 19.

I claim—

1. In means for lubricating exposed bearings, the combination, with a bearing-sleeve having its interior surface grooved to provide steamways, a lubricant-pipe communicating with the interior of the bearing, and a heating-pipe adapted to supply a heated fluid to the surface of the lubricant-pipe and to the steamways in the bearing, substantially as described.

2. In means for lubricating exposed bearings, the combination of a bushing to receive the rotating part, a sleeve exterior to said bushing, said sleeve having its interior surface grooved to provide steamways, a pipe to convey a lubricant to the interior of the bushing, and a heating-pipe to supply a heated fluid to the steamways surrounding the bushing, substantially as described.

3. An extended tubular bearing having an annular groove in its periphery and a stationary cap fitted over said groove, whereby to inclose a space or chamber, a pipe to convey a heated fluid through said cap to the chamber, and a pipe to convey said fluid from said chamber to a point along said sleeve, substantially as described.

GEORGE WARRINGTON.

Witnesses:
E. L. HUBER,
N. M. BOND.